US011662944B2

(12) United States Patent
Ke

(10) Patent No.: US 11,662,944 B2
(45) Date of Patent: May 30, 2023

(54) METHOD AND APPARATUS FOR PERFORMING RESUMING MANAGEMENT

(71) Applicant: Silicon Motion, Inc., Hsinchu County (TW)

(72) Inventor: Kuan-Yu Ke, Hsinchu County (TW)

(73) Assignee: Silicon Motion, Inc., Hsinchu County (TW)

( * ) Notice: Subject to any disclaimer, the term of this patent is extended or adjusted under 35 U.S.C. 154(b) by 341 days.

(21) Appl. No.: 17/086,445

(22) Filed: Nov. 1, 2020

(65) Prior Publication Data
US 2021/0279003 A1 Sep. 9, 2021

(30) Foreign Application Priority Data
Mar. 3, 2020 (TW) .................................. 109106873

(51) Int. Cl.
*G06F 3/06* (2006.01)
(52) U.S. Cl.
CPC .......... *G06F 3/0659* (2013.01); *G06F 3/0611* (2013.01); *G06F 3/0679* (2013.01)
(58) Field of Classification Search
CPC ..... G06F 3/0659; G06F 3/0697; G06F 3/0611
See application file for complete search history.

(56) References Cited
U.S. PATENT DOCUMENTS

| 7,953,892 | B2 | 5/2011 | Kegoya |
| 9,655,810 | B2 | 5/2017 | Macey |
| 2016/0232088 | A1* | 8/2016 | Mohan ................ G06F 12/0246 |
| 2018/0314223 | A1 | 11/2018 | Nickerson |
| 2019/0114177 | A1* | 4/2019 | Chung ................. G06F 9/4403 |
| 2020/0409602 | A1* | 12/2020 | Lee ....................... G06F 3/0656 |

FOREIGN PATENT DOCUMENTS

| EP | 2 380 081 B1 | 11/2013 |
| TW | 201913290 A | 4/2019 |

* cited by examiner

Primary Examiner — Kalpit Parikh
(74) Attorney, Agent, or Firm — Winston Hsu

(57) ABSTRACT

A method and apparatus for performing resuming management are provided. The method includes: utilizing a boot loader to load a group of In-System Programming (ISP) codes; storing information to be retained, including a resume ISP loader, into a retention region of a RAM, for being retained during sleeping; determining whether to start sleeping, and generating a determining result; in response to the determining result, controlling the memory device to start sleeping; after starting sleeping, determining whether a wake-up event occurs; after the wake-up event occurs, executing a first ISP code within the group of ISP codes to start performing a first operation; and executing the resume ISP loader to load other ISP codes within the group of ISP codes.

20 Claims, 4 Drawing Sheets

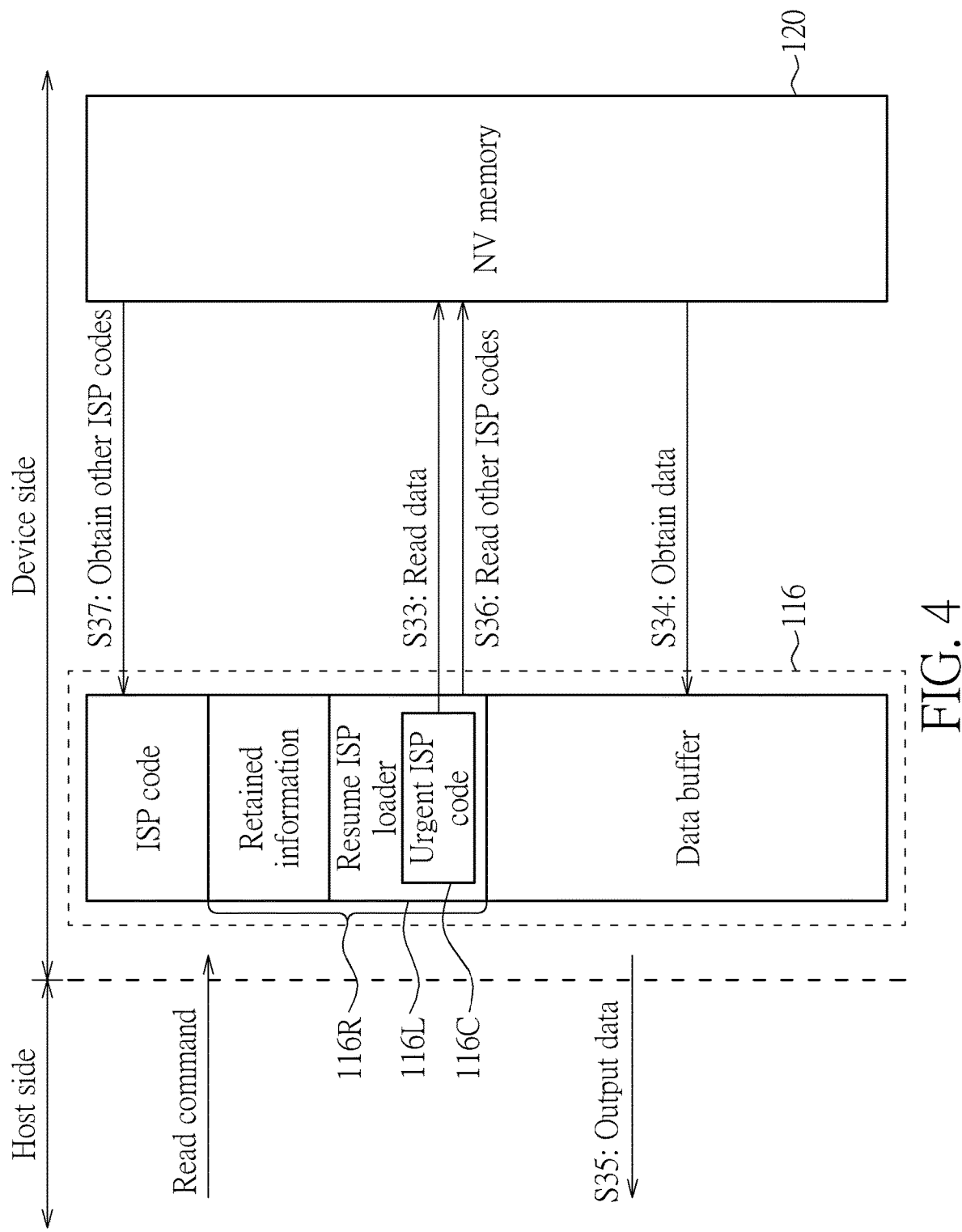

METHOD AND APPARATUS FOR PERFORMING RESUMING MANAGEMENT

BACKGROUND OF THE INVENTION

1. Field of the Invention

The present invention is related to memory control, and more particularly, to a method for performing resuming management, and an associated apparatus such as a memory device, a controller thereof and an electronic device.

2. Description of the Prior Art

Developments in memory technology have enabled the wide application of various portable or non-portable memory devices, such as memory cards respectively conforming to the SD/MMC, CF, MS and XD specifications, and embedded memory devices respectively conforming to the UFS and eMMC specifications. Improving access control of these memory devices remains an issue to be solved in the art.

NAND flash memories may comprise single level cell (SLC) and multiple level cell (MLC) flash memories. In an SLC flash memory, each transistor used as a memory cell may store either of two electrical charge values respectively corresponding to logic values 0 and 1. In comparison, the storage ability of each transistor used as a memory cell in an MLC flash memory may be fully utilized. The transistor in the MLC flash memory can be driven by a voltage higher than that in the SLC flash memory, and different voltage levels can be utilized to record information of at least two bits (e.g. 00, 01, 11, or 10). In theory, the recording density of the MLC flash memory may reach at least twice the recording density of the SLC flash memory, and is therefore preferred by manufacturers of NAND flash memories.

The lower cost and larger capacity of the MLC flash memory means it is more likely to be applied in memory devices than an SLC flash memory. The MLC flash memory does have instability issues, however. To ensure that access control of the flash memory in the memory device meets required specifications, a controller of the flash memory may be equipped with some management mechanisms for properly managing data access.

Even memory devices with the above management mechanisms may have certain deficiencies, however. For example, the memory device may enter a power saving mode to save power; when it is accessed, it may need to re-load huge and complicated program codes, causing the memory device to temporarily have no response, which thereby degrades the overall performance.

Thus, there is a need for a novel method and associated architecture to solve the problems of the related art without introducing any side effect or in a way that is less likely to introduce side effects.

SUMMARY OF THE INVENTION

An objective of the present invention is to provide a method for performing resuming management and an associated apparatus such as a memory device, a controller thereof and an electronic device, to solve the problem mentioned above.

At least one embodiment of the present invention provides a method for performing resuming management, wherein the method is applied to a controller of a memory device. The memory device may comprise the controller and a non-volatile (NV) memory, and the NV memory may comprise at least one NV memory element (e.g. one or more NV memory elements). The method may comprise: utilizing a boot loader to load a group of In-System Programming (ISP) codes, wherein the controller comprises a random access memory (RAM), and the group of ISP codes is loaded into the RAM; storing information to be retained, comprising a resume ISP loader, into a retention region of the RAM, for being retained during sleeping; determining whether to start sleeping, and generating a determining result, wherein the determining result indicates whether to start sleeping; in response to the determining result, controlling the memory device to start sleeping; after starting sleeping, determining whether any wake-up event occurs; after said any wake-up event occurs, executing a first ISP code within the group of ISP codes to start performing a first operation, wherein the first ISP code is obtained through the resume ISP loader; and executing the resume ISP loader to load other ISP codes within the group of ISP codes.

In addition to the method mentioned above, the present invention also provides a memory device comprising an NV memory and a controller. The NV memory is configured to store information, wherein the NV memory may comprise at least one NV memory element (e.g. one or more NV memory elements). The controller is coupled to the NV memory, and the controller is configured to control operations of the memory device. In addition, the controller comprises a processing circuit, wherein the processing circuit is configured to control the controller according to a plurality of host commands from a host device, to allow the host device to access the NV memory through the controller. The controller further comprises a RAM, and the RAM is configured to store information, wherein the RAM comprises a retention region. For example, the controller utilizes a boot loader to load a group of ISP codes, wherein the group of ISP codes is loaded into the RAM; the controller stores information to be retained, comprising a resume ISP loader, into the retention region of the RAM, for being retained during sleeping; the controller determines whether to start sleeping, and generates a determining result, wherein the determining result indicates whether to start sleeping; in response to the determining result, the controller controls the memory device to start sleeping; after starting sleeping, the controller determines whether any wake-up event occurs; after said any wake-up event occurs, the controller executes a first ISP code within the group of ISP codes to start performing a first operation, wherein the first ISP code is obtained through the resume ISP loader; and the controller executes the resume ISP loader to load other ISP codes within the group of ISP codes.

According to some embodiments, the present invention also provides an associated electronic device. The electronic device may comprise the memory device mentioned above, and may further comprise: the host device, coupled to the memory device. The host device may comprise: at least one processor, configured to control operations of the host device; and a power supply circuit, coupled to at least one processor, configured to provide the at least one processor and the memory device with power. In addition, the memory device may provide the host device with storage space.

In addition to the method mentioned above, the present invention also provides a controller of a memory device, wherein the memory device comprises the controller and an NV memory. The NV memory may comprise at least one NV memory element (e.g. one or more NV memory elements). In addition, the controller comprises a processing circuit, wherein the processing circuit is configured to control the controller according to a plurality of host commands from a host device, to allow the host device to access the NV memory through the controller. The controller further comprises a RAM, and the RAM is configured to store information, wherein the RAM comprises a retention region. For example, the controller utilizes a boot loader to load a group of ISP codes, wherein the group of ISP codes is loaded into the RAM; the controller stores information to be retained, comprising a resume ISP loader, into the retention region of the RAM, for being retained during sleeping; the controller determines whether to start sleeping, and generates a determining result, wherein the determining result indicates whether to start sleeping; in response to the determining result, the controller controls the memory device to start sleeping; after starting sleeping, the controller determines whether any wake-up event occurs; after said any wake-up event occurs, the controller executes a first ISP code within the group of ISP codes to start performing a first operation, wherein the first ISP code is obtained through the resume ISP loader; and the controller executes the resume ISP loader to load other ISP codes within the group of ISP codes.

The method and the associated apparatus provided by the present invention can ensure that the memory device can properly operate under various situations, where examples of the apparatus mentioned above comprise: the controller, the memory device, the electronic device, etc. In addition, by executing the first ISP code to start performing the first operation, the method and the associated apparatus provided by the present invention can ensure real-time response between the host device and the memory device, which will improve the overall performance.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 4 illustrates an access control scheme of the method shown in FIG. 2 according to another embodiment of the present invention.

DETAILED DESCRIPTION

Figure 1:
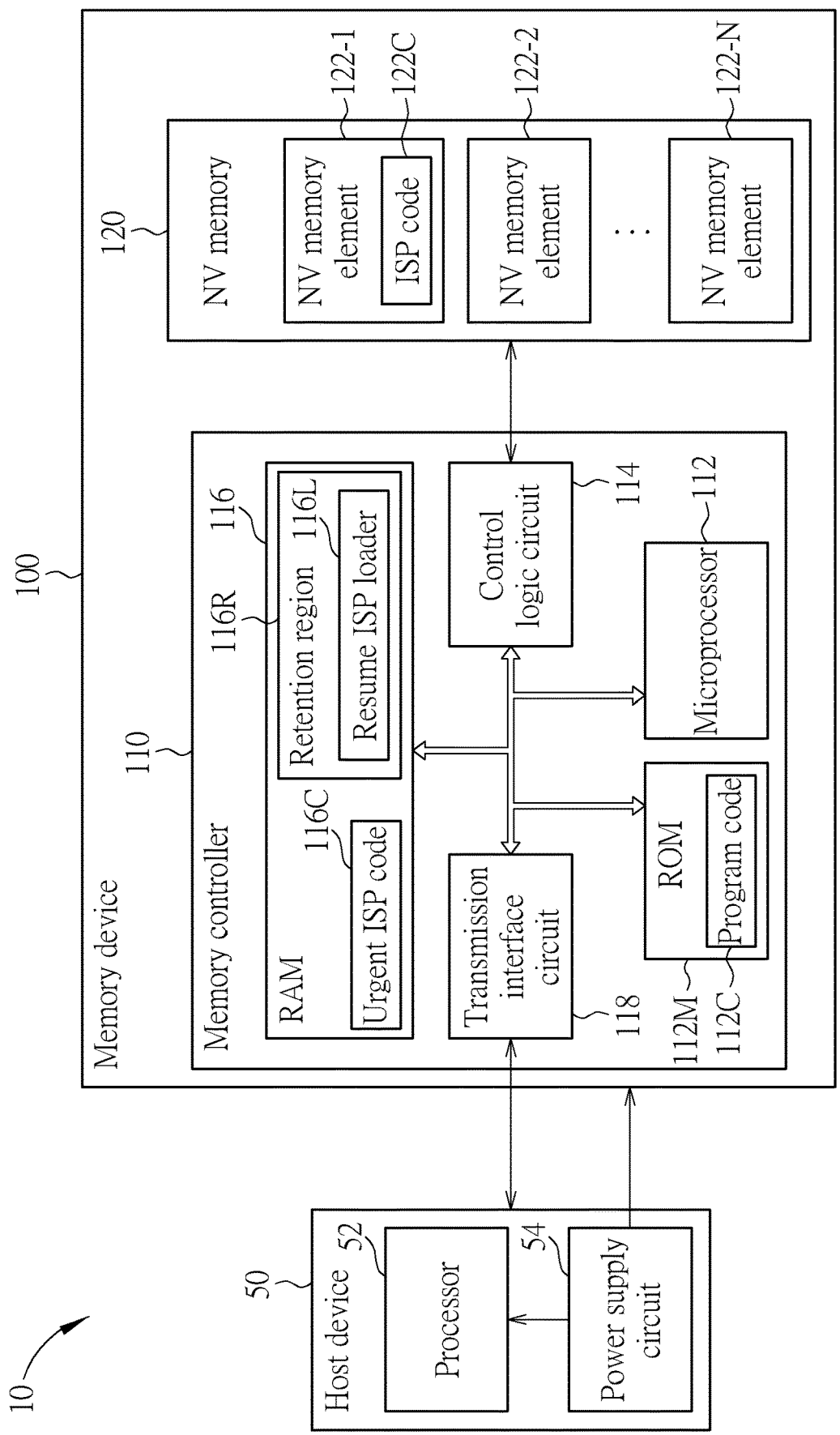
FIG. 1 is a diagram of an electronic device according to an embodiment of the present invention.

FIG. 1 is a diagram of an electronic device 10 according to an embodiment of the present invention, where the electronic device 10 may comprise a host device 50 and a memory device 100. The host device 50 may comprise at least one processor (e.g. one or more processors) which may be collectively referred to as the processor 52, and may further comprise a power supply circuit 54 that is coupled to the processor 52. The processor 52 is configured to control operations of the host device 50, and the power supply circuit 54 is configured to provide the processor 52 and the memory device 100 with power, and output one or more driving voltages to the memory device 100. The memory device 100 may be configured to provide the host device 50 with storage space, and may obtain the one or more driving voltages from the host device 50 as a power source of the memory device 100. Examples of the host device 50 may include, but are not limited to: a multifunctional mobile phone, a wearable device, a tablet computer, and a personal computer such as a desktop computer and a laptop computer. Examples of the memory device 100 may include, but are not limited to: a portable memory device (e.g. a memory card conforming to the SD/MMC, CF, MS or XD specification), a solid state drive (SSD), and various types of embedded storage devices respectively conforming to the Universal Flash Storage (UFS) and embedded Multi Media Card (eMNIC) specifications. According to this embodiment, the memory device 100 may comprise a controller such as a memory controller 110, and may further comprise a non-volatile (NV) memory 120, where the controller is configured to control operations of the memory device 100 and access the NV memory 120, and the NV memory 120 is configured to store information. The NV memory 120 may comprise at least one NV memory element (e.g. one or more NV memory elements), such as a plurality of NV memory elements 122-1, 122-2, . . . , and 122-N, where "N" may represent a positive integer that is greater than one. For example, the NV memory 120 may be a flash memory, and the plurality of NV memory elements 122-1, 122-2, . . . , and 122-N may be a plurality of flash memory chips or a plurality of flash memory dies, but the present invention is not limited thereto.

As shown in FIG. 1, the memory controller 110 may comprise a processing circuit such as a microprocessor 112, a storage unit such as a read only memory (ROM) 112M, a control logic circuit 114, a random access memory (RAM) 116, and a transmission interface circuit 118, where the above components may be coupled to one another via a bus. The RAM 116 is implemented by a Static RAM (SRAM), but the present invention is not limited thereto. The RAM 116 may be configured to provide the memory controller 110 with internal storage space. For example, the RAM 116 may be utilized as a buffer memory for buffering data. In addition, the ROM 112M of this embodiment is configured to store a program code 112C, and the microprocessor 112 is configured to execute the program code 112C to control access of the NV memory 120. Note that, in some examples, the program code 112C may be stored in the RAM 116 or any type of memory. Furthermore, a data protection circuit (not shown) within the control logic circuit 114 may protect data and/or perform error correction. The transmission interface circuit 118 may conform to a specific communications specification (e.g. the Serial Advanced Technology Attachment (SATA) specification, the Universal Serial Bus (USB) specification, the Peripheral Component Interconnect Express (PCIE) specification, the eMMC specification, or the UFS specification, and may perform communications according to the specific communications specification.

In this embodiment, the host device 50 accesses the memory device 100 by transmitting host commands and corresponding logical addresses to the memory controller 110. The memory controller 110 receives the host commands and the logical addresses, and translates the host commands into memory operating commands (which may be referred to as operating commands for brevity), and further controls the NV memory 120 with the operating commands to perform reading, writing/programing, etc. on memory units (e.g. data pages) having physical addresses within the NV memory 120, where the physical addresses may correspond to the logical addresses.

Under a condition where the host device does not perform any access operation on the memory device 100 (for example, in response to a time period of the memory device 100 being in an idle status reaching a predetermined time period, or in response to triggering of a predetermined signal from the host device 50), the memory controller 110 may temporarily stop providing most internal components such as a majority of internal components among all internal components within the memory controller 110 with power, and keep providing a retention region 116R within the RAM 116 with power, for storing important information of the memory device 100 (e.g. one or more tables such as a system information table and an address mapping table, multiple variables, etc.) as retained information.

Figure 2:
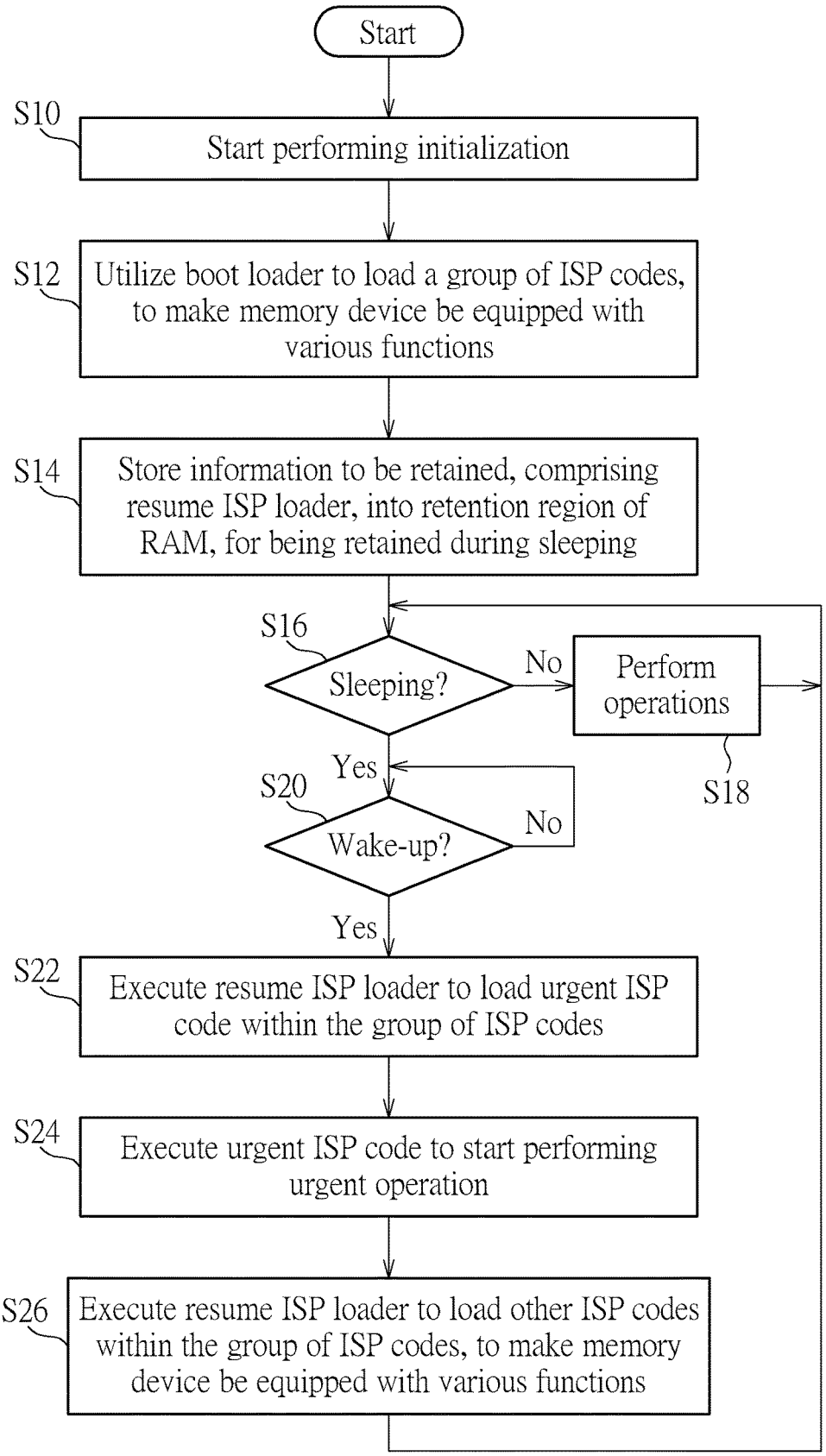
FIG. 2 is a diagram illustrating a flowchart of a method for performing resuming management according to an embodiment of the present invention.

FIG. 2 is a diagram illustrating a flowchart of a method for performing resuming management according to an embodiment of the present invention. The method may be applied to the architecture shown in FIG. 1 (e.g. the electronic device 10, the memory device 100, the memory controller 110, etc.), and may be executed by the memory controller 110 of the memory device 100.

In Step S10, the memory controller 110 starts performing initialization, and more particularly, starts executing the program code 112C. For example, the program code 112C may comprise one or more program modules, for performing basic control of the memory device 100.

In Step S12, the memory controller 110 utilizes a boot loader to load a group of In-System Programming (ISP) codes 122C, and more particularly, to load the ISP code 122C into the RAM 116 from the NV memory 120 (e.g. the NV memory element 122-1), to make the memory device be equipped with various functions, where the one or more program modules within the program code 112C may comprise the boot loader, but the present invention is not limited thereto. For example, locations for storing the one or more program modules may vary, and more particularly, may be one or more of the plurality of NV memory elements 122-1, 122-2, . . . , and 122-N. According to this embodiment, the group of ISP code 122C may comprise multiple program modules related to access (e.g. read, write and erase), such as a read operation module, a lookup operation module, a read refresh module, a read reclaim module, a read garbage collection module, and an uncorrectable error correction code (UECC) module, for performing read, lookup, read refresh, read reclaim, garbage collection during read, and error handling regarding UECC error, where the last four modules within the above six modules may be associated with error handling, but the present invention is not limited thereto. In some embodiments, the group of ISP codes 122C may vary.

In Step S14, the memory controller 110 stores information to be retained, comprising a resume ISP loader 116L, into the retention region 116R of the RAM 116, for being retained during sleeping. Based on the architecture shown in FIG. 1, the sleeping may represent a special type of suspension, and more particularly, a suspension corresponding to partial information retention. For example, during sleeping, the memory controller 110 may retain the resume ISP loader, the one or more tables, the multiple variables, etc. in the retention region 116R, and may temporarily stop providing other regions within the RAM 116 with power, to allow a majority of the group of ISP codes 122C to disappear from the RAM 116.

In Step S16, the memory controller 110 determines whether to start sleeping, and more particularly, generates a determining result, where the determining result indicates whether to start sleeping. If the result indicates "Yes" (e.g. in response to the time period of the memory device being in the idle status reaching the predetermined time period), the memory controller 110 may control the memory device to start sleeping in response to the determining result, and more particularly, temporarily stop providing the aforementioned majority of internal components within the memory controller 110 with power, and then execute Step S20 to determine whether to stop sleeping; if the result indicates "No", the memory controller 110 may execute Step S18.

In Step S18, the memory controller 110 controls the memory device 100 to perform one or more operations, and more particularly, to perform the one or more operations (e.g. the read operation, the write operation, etc.) in response to one or more host commands (e.g. the read command, the write command, etc.).

In Step S20, during sleeping, the memory controller 110 determines whether any wake-up event occurs (labeled "wake-up" in FIG. 2 for brevity). If the result indicates "Yes" (e.g. the transmission interface circuit 118 receives any command from the host device 50), the memory controller 110 may trigger the memory controller 110 to provide the aforementioned majority of internal components within the memory controller 110 with power, in conjunction with the aforementioned other regions within the RAM 116, and then execute Step S22; if the result indicates "No", the memory controller 110 may execute Step S20 to keep waiting. For example, the memory controller 110 may utilize the transmission interface circuit 118 to detect the wake-up event such as any command from the host device 50, and the transmission interface circuit 118 may trigger the memory controller 110 to provide the aforementioned majority of internal components within the memory controller 110 with power in response to the wake-up event, in conjunction with the aforementioned other regions within the RAM 116, to wake up the memory device 100. The memory controller 110 may also provide the aforementioned other regions within the RAM 116 with power, to make the RAM 116 normally store information, in order to prevent information loaded later into the RAM (more particularly, the aforementioned other regions) from disappearing, but the present invention is not limited thereto. In some embodiments, the memory controller 110 may utilize a physical layer (PHY) circuit within the transmission interface circuit 118 to detect the wake-up event.

In Step S22, the memory controller 110 executes the resume ISP loader 116L to load an urgent ISP code 116C within the group of ISP codes 122C. The size of the urgent ISP code 116C can be small, e.g. 16 kilobytes (KB) or 8 KB. Thus, the operation of loading the urgent ISP code 116C may be completed immediately.

In Step S24, the memory controller 110 executes the urgent ISP code 116C to start performing an urgent operation, such as a first operation after the memory device 100 wakes up. For example, the urgent operation may represent a read operation, and the urgent ISP code 116C may represent the read operation module, wherein for better comprehension, the host device 50 and the memory device 100 may be a multifunctional mobile phone and an embedded memory device installed therein, respectively, but the present invention is not limited thereto. In some embodiments, the urgent operation may comprise other types of operations, and the urgent ISP code 116C may comprise a corresponding program module, wherein according to the wake-up event such as the aforementioned command, the resume ISP loader 116L may select a certain program module corresponding to this command from the multiple program modules to be the urgent ISP code 116C, but the present invention is not limited thereto.

In Step S26, the memory controller 110 executes the resume ISP loader 116L to load other ISP codes within the group of ISP codes 122C, to make the memory device 100 be equipped with the aforementioned various functions.

For better comprehension, the method may be illustrated by the working flow shown in FIG. 2, but the present invention is not limited thereto. According to some embodiments, one or more steps may be added, deleted or modified in the working flow shown in FIG. 2.

In addition, the memory controller 110 may control the memory device 100 to start sleeping in response to the time period of the memory device 100 being in the idle status reaching the predetermined time period, and the wake-up event may represent any command from the host device 50, but the present invention is not limited thereto. In some embodiments, the memory controller 110 may control the memory device 100 to start sleeping in response to the triggering of the predetermined signal, and the wake-up event may represent another predetermined signal. In some embodiments, the memory controller 110 may control the memory device 100 to start sleeping in response to triggering of the predetermined signal having a first logic state, and the wake-up event may represent the predetermined signal having a second logic state. For example, the first logic state and the second logic state may be implemented as a low voltage level and a high voltage level of the predetermined signal, respectively. In another example, the first logic state and the second logic state may be implemented as a high voltage level and a low voltage level of the predetermined signal, respectively.

Figure 3:
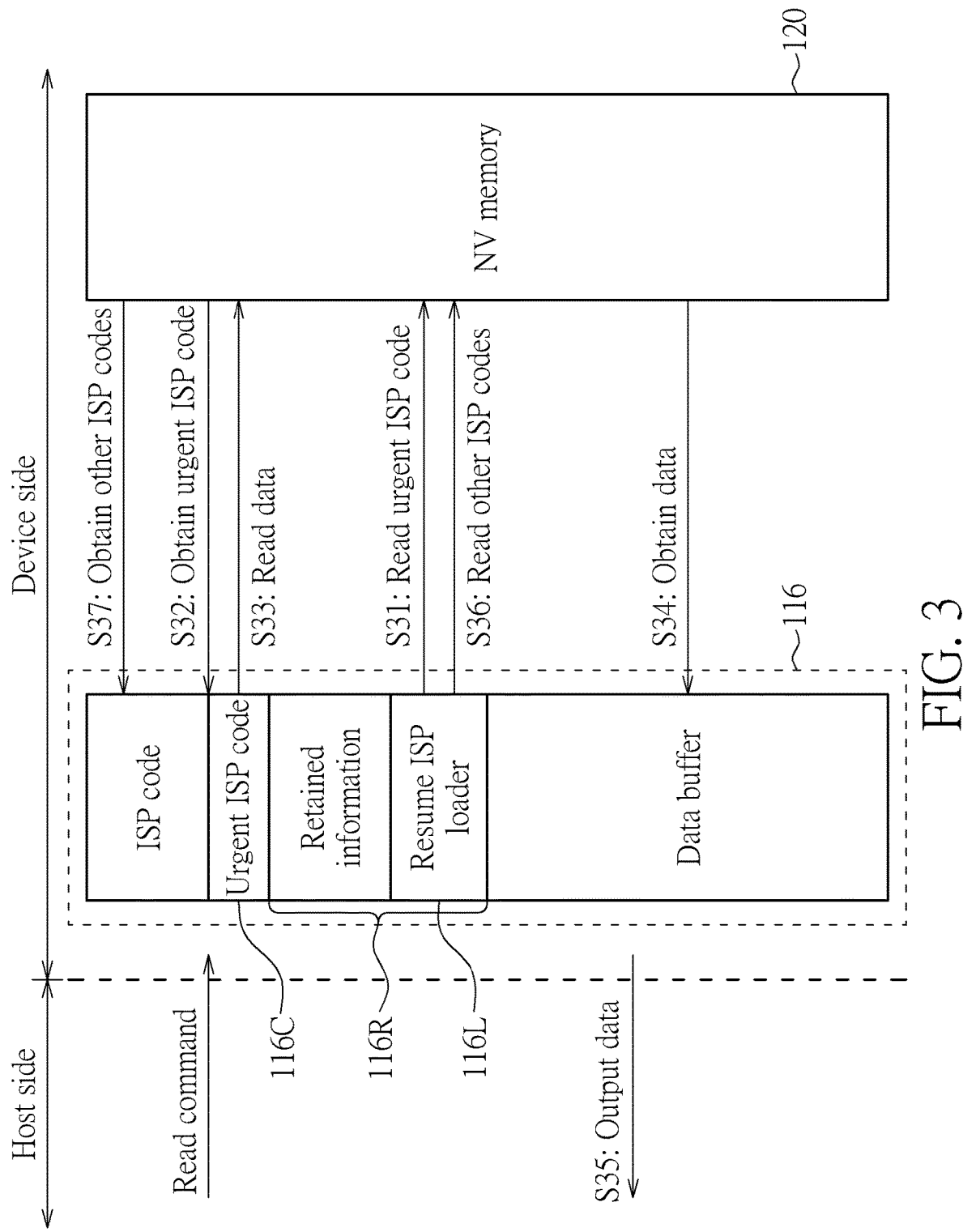
FIG. 3 illustrates an access control scheme of the method shown in FIG. 2 according to an embodiment of the present invention.

FIG. 3 illustrates an access control scheme of the method shown in FIG. 2 according to an embodiment of the present invention, where a host side and a device side correspond to the host device 50 and the memory device 100, respectively. For better comprehension, assume that the wake-up event comprises a read command from the host device 50, but the present invention is not limited thereto.

In Step S31, the memory controller 110 (e.g. the microprocessor running the resume ISP loader 116L) may send a read operation command to the NV memory 120 through the control logic circuit 114, to control the NV memory 120 to read the urgent ISP code 116C.

In Step S32, the memory controller 110 may obtain the urgent ISP code 116C through the control logic circuit 114, and more particularly, may load the urgent ISP code 116C into the RAM 116.

In Step S33, the memory controller 110 (e.g. the microprocessor running the resume ISP loader 116L) may send another read operation command to the NV memory 120 through the control logic circuit 114, to control the NV memory 120 to read data, such as data corresponding to the read command.

In Step S34, the memory controller 110 may obtain the data mentioned in Step S33 through the control logic circuit 114, and more particularly, may buffer the data in a data buffer within the RAM 116.

In Step S35, the memory controller 110 may output the data (such as the data being buffered in the data buffer) through the transmission interface circuit 118.

In Step S36, the memory controller 110 (e.g. the microprocessor running the resume ISP loader 116L) may send yet another read command to the NV memory 120 through the control logic circuit 114, to control the NV memory 120 to read the aforementioned other ISP codes within the group of ISP codes 122C.

In Step S37, the memory controller 110 may obtain the other ISP codes mentioned in Step S36 through the control logic circuit 114, and more particularly, may load the aforementioned other ISP codes into the RAM 116.

FIG. 4 illustrates an access control scheme of the method shown in FIG. 2 according to another embodiment of the present invention. In comparison with the access control scheme shown in FIG. 3, the urgent ISP code 116C of this embodiment may be embedded in the resume ISP loader 116L, and may be retained in the retention region 116R during sleeping, where the retention region 116R may be slightly enlarged, and the Steps S31 and S33 may be omitted, but the present invention is not limited thereto. For brevity, similar descriptions for this embodiment are not repeated in detail here.

According to some embodiments, under a condition where the urgent ISP code 116C is embedded in the resume ISP loader 116L, Step S22 may be omitted in the working flow shown in FIG. 2, wherein, when the determining result of Step S20 is "Yes", the memory controller 110 may execute Step S24. For brevity, similar descriptions for these embodiments are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing resuming management, the method being applied to a controller of a memory device, the memory device comprising the controller and a non-volatile (NV) memory, the NV memory comprising at least one NV memory element, the method comprising:
   utilizing a boot loader to load a group of In-System Programming (ISP) codes, wherein the controller comprises a random access memory (RAM), and the group of ISP codes is loaded into the RAM;
   storing information to be retained, comprising a resume ISP loader, into a retention region of the RAM, for being retained during sleeping;
   determining whether to start sleeping, and generating a determining result, wherein the determining result indicates whether to start sleeping;
   in response to the determining result, controlling the memory device to start sleeping;
   after starting sleeping, determining whether a wake-up event occurs;
   after the wake-up event occurs, executing a first ISP code within the group of ISP codes to start performing a first operation, wherein the first ISP code is obtained through the resume ISP loader; and
   executing the resume ISP loader to load other ISP codes within the group of ISP codes.

2. The method of claim 1, wherein the step of utilizing the boot loader to load the group of ISP codes further comprises:
   utilizing the boot loader to load the group of ISP codes into the RAM from the NV memory, to make the memory device be equipped with various functions.

3. The method of claim 2, wherein the step of executing the resume ISP loader to load the other ISP codes within the group of ISP codes further comprises:
   executing the resume ISP loader to load the other ISP codes within the group of ISP codes, to make the memory device be equipped with the various functions.

4. The method of claim 1, wherein sleeping represents a suspension corresponding to partial information retention.

5. The method of claim 1, wherein during sleeping, the controller retains the resume ISP loader in the retention region, and temporarily stops providing other regions within the RAM with power, to allow a majority of the group of ISP codes to disappear from the RAM.

6. The method of claim 5, wherein in response to the wake-up event, the controller provides the other regions within the RAM with power, to make the RAM normally store information, in order to prevent information loaded into the RAM later from disappearing.

7. The method of claim 1, further comprising:
after the wake-up event occurs, executing the resume ISP loader to load the first ISP code within the group of ISP codes, wherein the first ISP code is obtained by executing the resume ISP loader.

8. The method of claim 1, wherein the first ISP code is embedded in the resume ISP loader.

9. The method of claim 1, wherein the group of ISP codes comprises multiple program modules related to access, the first operation represents a read operation, and the first ISP code represents a read operation module within the multiple program modules.

10. The method of claim 9, wherein the multiple program modules comprise the read operation module, a lookup module, a read refresh module, a read reclaim module, a read garbage collection module, and an uncorrectable error correction code (UECC) module, for performing read, lookup, read refresh, read reclaim, garbage collection during read, and error handling regarding UECC error.

11. A memory device, comprising:
a non-volatile (NV) memory, configured to store information, wherein the NV memory comprises at least one NV memory element; and
a controller, coupled to the NV memory, configured to control operations of the memory device, wherein the controller comprises:
a processing circuit, configured to control the controller according to a plurality of host commands from a host device, to allow the host device to access the NV memory through the controller; and
a random access memory (RAM), configured to store information, wherein the RAM comprises a retention region;
wherein:
the controller utilizes a boot loader to load a group of In-System Programming (ISP) codes, wherein the group of ISP codes is loaded into the RAM;
the controller stores information to be retained, comprising a resume ISP loader, into the retention region of the RAM, for being retained during sleeping;
the controller determines whether to start sleeping, and generates a determining result, wherein the determining result indicates whether to start sleeping;
in response to the determining result, the controller controls the memory device to start sleeping;
after starting sleeping, the controller determines whether a wake-up event occurs;
after the wake-up event occurs, the controller executes a first ISP code within the group of ISP codes to start performing a first operation, wherein the first ISP code is obtained through the resume ISP loader; and
the controller executes the resume ISP loader to load other ISP codes within the group of ISP codes.

12. The memory device of claim 11, wherein the controller utilizes the boot loader to load the group of ISP codes into the RAM from the NV memory, to make the memory device be equipped with various functions.

13. The memory device of claim 12, wherein the controller executes the resume ISP loader to load the other ISP within the group of ISP codes, to make the memory device be equipped with the various functions.

14. The memory device of claim 11, wherein sleeping represents a suspension corresponding to partial information retention.

15. The memory device of claim 11, wherein during sleeping, the controller retains the resume ISP loader in the retention region, and temporarily stops providing other regions within the RAM with power, to allow a majority of the group of ISP codes to disappear from the RAM.

16. The memory device of claim 15, wherein in response to the wake-up event, the controller provides the other regions within the RAM with power, to make the RAM normally store information, in order to prevent information loaded into the RAM later from disappearing.

17. The memory device of claim 11, wherein after the wake-up event occurs, the controller executes the resume ISP loader to load the first ISP code within the group of ISP codes, wherein the first ISP code is obtained by executing the resume ISP loader.

18. The memory device of claim 11, wherein the first ISP code is embedded in the resume ISP loader.

19. An electronic device comprising the memory device of claim 11, further comprising:
the host device, coupled to the memory device, wherein the host device comprises:
at least one processor, configured to control operations of the host device; and
a power supply circuit, coupled to the at least one processor, configured to provide the at least one processor and the memory device with power;
wherein the memory device provides the host device with storage space.

20. A controller of a memory device, the memory device comprising the controller and a non-volatile (NV) memory, the NV memory comprising at least one NV memory element, the controller comprising:
a processing circuit, configured to control the controller according to a plurality of host commands from a host device, to allow the host device to access the NV memory through the controller; and
a random access memory (RAM), configured to store information, wherein the RAM comprises a retention region;
wherein:
the controller utilizes a boot loader to load a group of In-System Programming (ISP) codes, wherein the group of ISP codes is loaded into the RAM;
the controller stores information to be retained, comprising a resume ISP loader, into the retention region of the RAM, for being retained during sleeping;
the controller determines whether to start sleeping, and generates a determining result, wherein the determining result indicates whether to start sleeping;
in response to the determining result, the controller controls the memory device to start sleeping;
after starting sleeping, the controller determines whether a wake-up event occurs;
after the wake-up event occurs, the controller executes a first ISP code within the group of ISP codes to start performing a first operation, wherein the first ISP code is obtained through the resume ISP loader; and
the controller executes the resume ISP loader to load other ISP codes within the group of ISP codes.

* * * * *